(12) United States Patent
König et al.

(10) Patent No.: US 11,046,510 B2
(45) Date of Patent: Jun. 29, 2021

(54) CONTAINER AND METHOD FOR THE OPERATION THEREOF

(71) Applicant: ZENTIS GMBH & CO. KG, Aachen (DE)

(72) Inventors: Phillip König, Aachen (DE); Tim Freialdenhoven, Eschweiler (DE); Ivo Frederik Wasserkordt, Lanaken (BE); Peter Stelter, Aachen (DE); Stephan Jansen, Aachen (DE)

(73) Assignee: ZENTIS GMBH & CO. KG, Aachen (DE)

( * ) Notice: Subject to any disclaimer, the term of this patent is extended or adjusted under 35 U.S.C. 154(b) by 0 days.

(21) Appl. No.: 16/982,645

(22) PCT Filed: Jan. 15, 2019

(86) PCT No.: PCT/EP2019/050930
§ 371 (c)(1),
(2) Date: Sep. 21, 2020

(87) PCT Pub. No.: WO2019/179667
PCT Pub. Date: Sep. 26, 2019

(65) Prior Publication Data
US 2021/0024285 A1    Jan. 28, 2021

(30) Foreign Application Priority Data
Mar. 22, 2018  (DE) ............ 10 2018 106 790.9

(51) Int. Cl.
*B65D 90/48* (2006.01)
*B65D 88/26* (2006.01)
(Continued)

(52) U.S. Cl.
CPC ............. *B65D 90/48* (2013.01); *B65D 88/26* (2013.01); *B65D 90/44* (2013.01); *G01F 1/46* (2013.01);
(Continued)

(58) Field of Classification Search
CPC ........ B65D 90/48; B65D 88/26; B65D 90/44; B65D 2590/0083; G01F 1/46;
(Continued)

(56) References Cited

U.S. PATENT DOCUMENTS 3,833,014 A * 9/1974 Scheetz ................. B65D 90/44
                                                137/251.1
3,937,601 A * 2/1976 Miller .................... B62D 5/097
                                                418/61.3
(Continued)

FOREIGN PATENT DOCUMENTS

DE    19954646 A1    5/2001
DE    60316694 T2    7/2008
(Continued)

*Primary Examiner* — An T Nguyen
(74) *Attorney, Agent, or Firm* — Lucas & Mercanti, LLP

(57) ABSTRACT

A container for transporting flowable filling material includes a tank with a gas connection to which a protective gas line can be connected. A sensor device including an adapter element and a telemetry module is connected to the gas connection of the tank by the adapter device. The adapter element has a gas connection piece and a medium channel. A protective gas line can be connected to the gas connection piece of the adapter when the adapter is connected to the gas connection of the tank so that a protective gas can be guided through the gas connection piece and the medium channel of the adapter and into an interior of the tank. The telemetry module has a sensor that senses data relating to a state parameter of the container and/or filling material and a transmitter for wirelessly transmitting the data.

22 Claims, 9 Drawing Sheets

(51) Int. Cl.
*B65D 90/44* (2006.01)
*G01F 1/46* (2006.01)
*G01L 19/00* (2006.01)
*G08C 17/02* (2006.01)
*G01K 1/024* (2021.01)
*G01P 15/00* (2006.01)
*G01S 19/13* (2010.01)

(52) U.S. Cl.
CPC .......... *G01L 19/0007* (2013.01); *G08C 17/02* (2013.01); *G01K 1/024* (2013.01); *G01P 15/00* (2013.01); *G01S 19/13* (2013.01)

(58) Field of Classification Search
CPC .... G01L 19/0007; G08C 17/02; G01K 1/024; G01P 15/00; G01S 19/13; H01J 49/0027; F04C 28/24
See application file for complete search history.

(56) References Cited

U.S. PATENT DOCUMENTS

| | | | | |
|---|---|---|---|---|
| 3,963,144 | A * | 6/1976 | Berwald | B65D 88/06 |
| | | | | 220/728 |
| 3,999,668 | A * | 12/1976 | Clements | B65D 90/44 |
| | | | | 414/292 |
| 4,993,754 | A * | 2/1991 | Templin, Jr. | G01F 23/164 |
| | | | | 285/131.1 |
| 5,528,941 | A * | 6/1996 | Ogawa | G01L 19/0007 |
| | | | | 73/301 |
| 2003/0028336 | A1 | 2/2003 | Masar | |
| 2004/0046670 | A1 | 3/2004 | Adams | |
| 2007/0188983 | A1* | 8/2007 | Des Clers | B65D 90/22 |
| | | | | 361/600 |
| 2011/0233104 | A1* | 9/2011 | Olschimke | C07C 68/08 |
| | | | | 206/525 |
| 2017/0276093 | A1* | 9/2017 | Mori | F02K 9/44 |
| 2021/0002072 | A1* | 1/2021 | Konig | G01F 22/02 |
| 2021/0024285 | A1* | 1/2021 | Konig | G08C 17/02 |

FOREIGN PATENT DOCUMENTS

| | | |
|---|---|---|
| EP | 2695830 A1 | 2/2014 |
| WO | 2017139792 A1 | 8/2017 |

* cited by examiner

CONTAINER AND METHOD FOR THE OPERATION THEREOF

CROSS-REFERENCE TO RELATED APPLICATIONS

This application is a 371 of PCT/EP2019/050930, filed Jan. 15, 2019, which in turn claims the priority of DE 10 2018 106 790.9 filed Mar. 22, 2018. The priority of both applications is hereby claimed and both applications are incorporated herein by reference.

BACKGROUND OF THE INVENTION

The present application relates to a container for transporting flowable filling material. The present application further relates to a method for operating the container for transporting flowable filling material.

A container of the generic type can be used, in particular, to hold an aqueous, flowable filling material. In this respect, so-called fruit preparations which, for example, are filled at the manufacturer's premises and then sold to customers can be mentioned by way of example. The container comprises, in particular, a frame and a tank, wherein the tank can be supported at a distance above the ground by means of the frame. In this way, the tank is accessible from its bottom side. The tank has at least one opening on said bottom side, by means of which opening the tank can be charged with filling material or filling material can be removed from the tank. In order to prevent contamination of the filling material, in particular by oxygen, the tank additionally has at least one gas connection by means of which a protective gas line can be connected to the tank. It is possible to feed a protective gas, for example carbon dioxide, to the tank by means of a protective gas line of this kind. This ensures that, in addition to the filling material itself, an interior of the tank is filled exclusively with the protective gas. This results in the filling material which is located in the tank not being spoilt owing to contact with ambient air.

The connection of the protective gas line to the gas connection of the tank generally takes place before a removal apparatus is connected to the opening of the tank. As a result, at the time at which filling material is removed from the tank, the protective gas line is already connected in any case and protective gas can subsequently flow into the interior of the tank at any time. Accordingly, it is customary to detach the protective gas line from the tank only when removal of filling material has finished. In particular, it is conceivable to always first disconnect the removal apparatus from the opening before the protective gas line is detached from the gas connection.

The container is preferably formed from stainless steel, so that it can be used frequently as desired, that is to say charged and discharged in particular. If the filling material has a comparatively high viscosity, it may be expedient to pump out the filling material by means of a pump in order to remove said filling material from the tank. In order to ensure adequate subsequent flow of protective gas during the course of removal of the filling material from the interior of the tank, it is additionally advantageous when the protective gas line is connected to a pressure source which provides the protective gas under a specific pressure. This ensures that no foreign gas, in particular no ambient air, accidentally flows into the tank.

Containers of the kind described at the outset are already known in the prior art. In this respect, reference is made, by way of example, to European patent EP 1 544 030 B1 which concerns a frame of a container of this kind.

In everyday logistics relating to containers of this kind, it has been found that it would be desirable to have a large amount of information relating to individual containers available at any time and, if necessary, accessible to a customer. This can relate, for example, to a location of the respective container at which it is currently located. Furthermore, it is conceivable to gather and to query other state parameters of the container as such and also in relation to the filling material which is stored in the container.

The problem now addressed by the present application is that of providing a container of which the state can be monitored. In addition, a method for operating a container of this kind is to be specified.

BRIEF SUMMARY OF THE INVENTION

According to the invention, the container comprises at least one sensor device which has an adapter element and a telemetry module. The adapter element has the function of arranging or attaching the sensor device to the container in a force-transmitting manner. In an advantageous refinement of the invention, the sensor device can be connected in a releasable manner without destruction to the gas connection of the tank by means of the adapter element. Said gas connection is usually designed to be connected to a protective gas line by means of which a protective gas can be fed to the interior of the tank in the manner described at the outset. In order that a protective gas line can still be connected to the tank after the sensor device has been arranged at the gas connection of the tank and protective gas can be conducted into the interior of the tank by means of the protective gas line, the sensor device has at least one gas connector and at least one medium channel on or in its adapter element. The gas connector is suitable for receiving the protective gas line, so that, starting from the protective gas line, a protective gas can first be conducted through the gas connector and then through the medium channel of the adapter element into the interior of the tank. In other words, the sensor device according to the invention uses the gas connection which is present on each container in order to be releasably connected to the container in a force-transmitting manner. However, by way of providing a gas connector and a medium channel, the container thereupon does not lose the possibility of being connected to a protective gas line. In a certain way, the gas connection is laid only to the sensor device.

Furthermore, according to the invention, the sensor device has at least one sensor and at least one transmitter on its telemetry module. The sensor is suitable for detecting data relating to at least one state parameter of the container and/or of the filling material stored in said container, wherein this data can be used either immediately or with a time delay by means of the transmitter in a wireless manner. The data relates to at least one state parameter and can relate, in particular, to an absolute position of the sensor device or the container which is connected to it, wherein the sensor is formed by a geoposition sensor in this case. As an alternative or in addition, it is conceivable for the telemetry module to comprise at least one temperature sensor by means of which an ambient temperature of the container and/or a temperature of the filling material which is located in the tank can be measured. As an alternative or in addition, it is conceivable for the telemetry module to have at least one acceleration sensor, preferably a plurality of acceleration sensors, by means of which an acceleration state of the container can be detected. In this way, a state of the container was monitored, wherein it would be possible to identify, for example, a situation of the container falling over on the basis of correspondingly sharp fluctuations in an acceleration diagram of at least one acceleration sensor.

The container according to the invention has many advantages. In particular, it offers the possibility of detecting at least one state parameter, preferably a plurality of state parameters, depending on the sensor system, and transmitting said state parameter or parameters to a corresponding receiving unit by means of the transmitter. The transmitter can have, for example, a mobile radio module by means of which data can be transmitted within a respective mobile radio network. In this way, the sensor device is suitable for permanently and continuously monitoring a state of the container and making related data available, so that the container can be checked by way of remote maintenance and monitoring. For example, this makes it possible for a customer to query the location of a respective container "online", as it were, and in this way, for example, determine a predicted arrival time of the container at his premises. In the interests of quality assurance, it is likewise conceivable to permanently monitor a temperature of the filling material which is located in the container and in this way to ensure that the filling material has never been heated above or cooled below a certain temperature level. Furthermore, any damage to a respective container can be determined, wherein it is also possible to determine, for example, the location at which damage to a respective container has taken place in an advantageous combination of different data records. In this way, if necessary, responsibilities can be determined by way of position monitoring being able to be used to check whose area of responsibility a respective container was located in when it was damaged.

A further advantage of the container according to the invention is that the detachable sensor device can be connected to the container—and above all to containers which are already in circulation—in a particularly simple manner. To this end, it is only necessary to connect the sensor device to the gas connection of the tank that is present in any case and to fix said sensor device to the container in this way. Since the gas connection typically has to be used each time a container is charged and discharged in order to supply the interior of the tank with protective gas, it is additionally ensured that the gas connection is always easily accessible. As a rule, the gas connection is located on a top side of the container, in particular on its lid. Accordingly, the container according to the invention can be created in a particularly simple manner by retrofitting by way of existing containers each being individually equipped with a sensor device which is fitted on the existing gas connection of the tank. On account of the reproduction of a gas connector and a medium channel, it is furthermore still possible, in spite of the use of the sensor device, to connect a protective gas line to the container, so that the container can continue to be used without any restriction.

In a particularly advantageous refinement of the container according to the invention, the gas connection of the tank is equipped with a gas connector which can further comprise a quick-action coupling. The adapter element of the detachable sensor device is then designed in such a way that it can be fitted in an interlocking manner on this gas connector of the tank, wherein the gas connector which is formed on the adapter element reproduces in a compatible manner the gas connector of the tank at least with respect to its function. The gas connector of the adapter element and the gas connector of the tank are advantageously of at least substantially, preferably completely, identical design. In this refinement, it is particularly easily possible to connect a respective protective gas line to the container according to the invention without any adaptation since the gas connector of the adapter element of the sensor device is designed to be compatible with the actual gas connector of the tank. Since a connection coupling of the protective gas line is matched to the gas connector of the tank, said connection coupling from now on also fits on the gas connector of the adapter element that is of at least compatible, preferably identical, design. Accordingly, a functional restriction or conversion in connection with the use of the container according to the invention is not necessary. As an alternative or in addition, it is conceivable for the sensor device to be screwed to the gas connection of the tank, in particular by means of a union nut. However, in an alternative refinement of the invention, the sensor device can also be connected to the gas connection of the tank in a cohesive or materially joined manner, for example by a welded connection.

In a particularly advantageous refinement of the container, the medium channel of the adapter element has at least one constriction at which a cross section of the medium channel is reduced in relation to a cross section of the medium channel outside the constriction. The constriction is advantageously integrated into the medium channel in such a way that the cross section of the medium channel is widened on either side of the constriction. In other words, the medium channel is advantageously configured in such a way that gas flowing through the medium channel is accelerated in the region of the constriction and is then decelerated after leaving the constriction on account of the widening of the medium channel. During the course of acceleration of the gas, the dynamic pressure of said gas is locally increased within the medium channel and the static pressure is accordingly reduced, provided that the total pressure of the gas, which is provided from a pressurized gas cylinder for example, remains constant.

Furthermore, it is particularly advantageous when the sensor device has at least one spur line which interacts in terms of flow with the medium channel of the adapter element. A longitudinal axis of the spur line is preferably oriented perpendicularly to a longitudinal axis of the medium channel, so that the spur line meets the medium channel in a perpendicular manner. An embodiment in which the spur line meets the medium channel in the region of an abovementioned constriction is particularly preferred. By means of a spur line of this kind, it is possible to arrange a pressure sensor at that end of said spur line which is averted from the medium channel, it being possible to detect changes in the pressure within the spur line by means of said pressure sensor. A refinement of this kind of the sensor device renders possible measurement of a change in the static pressure within the medium channel, which change is produced on account of a flow rate of the gas flowing through the medium channel. This is based on the consideration that the greater the flow rate of the gas in the region of the constriction, the higher the dynamic pressure and, conversely, analogously to this, the lower the static pressure of the gas in the medium channel, provided that a total pressure of the gas which is made available by means of a pressure source is constant.

As a result of the change in the static pressure in the medium channel, the pressure in the spur line, to which only the static pressure of the gas is applied on account of its preferably perpendicular orientation in relation to the medium channel, also changes, wherein this change can be determined by means of the pressure sensor. In this way, it is possible to initially determine, in principle, that protective gas is flowing through the medium channel and consequently filling material is obviously being removed from the tank of the container. Otherwise, the protective gas would not flow into the tank, but rather the static pressure would only increase where possible, depending on the pressure level of the source of the protective gas. As a result, the combination of the constriction, the spur line and the pressure sensor accordingly allows the flow conditions of a protective gas to be monitored by the sensor device.

By means of recording and then evaluating a profile of data which is determined by means of the pressure sensor, it is possible to ultimately make a statement about the time period over which protective gas has flowed through the sensor device into the interior of the tank. This can be used to draw the conclusion that filling material was removed from the tank over the same time period. With knowledge of this time period, a statement can be made about a remaining filling level of the tank after the time period for removal of filling material has ended. If it is determined, for example, by means of evaluation of a pressure profile of the protective gas that filling material was removed from the tank over a time period of 10 minutes, it is possible to determine, when the mass flow of removal of the filling material from the tank is known, the remaining filling level of said filling material in relation to the starting filling level at the beginning of removal. A pressure profile curve, which was detected by means of the pressure sensor and then recorded, can exhibit characteristic fluctuations, in particular at moments at which a pump for removing the filling material is activated and deactivated, it being possible to use the interpretation of said characteristic fluctuations in the manner described above to make a statement about the removal time and resulting from this the quantity of filling material removed. For example, the pressure profile curve can show a sudden drop at the moment at which the pump is activated, this being attributable to a flow of the protective gas within the medium channel being established. This begins because a released volume in the interior of the tank is "refilled" with protective gas which flows through the gas connection of the tank—and therefore beforehand through the medium channel of the sensor device—into the interior. As a result of the protective gas flowing through the medium duct, the static pressure drops in the region of the constriction on account of the increase in dynamic pressure, and this is registered as a pressure drop by means of the pressure sensor which is present in the spur line which is connected to the constriction. Conversely, the static pressure in the spur line rises again when removal of filling material from the tank is ended, so that the time at which removal is ended can be determined.

Monitoring the filling level of a tank is of particular interest during the course of removing the filling material in principle since the tank is usually completely filled during a filling process in any case, so that a tank is then always full. However, during removal, it is very common for the filling material to be removed in stages, where possible over several days, so that it is of interest to precisely track the decrease in the filling level of the tank. Removal of the filling material from a respective tank can be highly individual depending on the use of the filling material and seldom follows the same pattern in practice.

If the mass flow of removal of filling material is not known, first removal of filling material from the completely filled tank and complete emptying of the tank can be determined at least reliably by way of evaluating the pressure curve. Qualitative filling level control is therefore always possible with the pressure sensor.

Irrespective of the configuration of the adapter element, it is further advantageous if the telemetry module of the sensor device has at least one geoposition sensor and/or at least one acceleration sensor and/or at least one temperature sensor. Data which is recorded by means of these sensors can be used in order to assess a state of the respective container. The sensor device advantageously further comprises at least one data logger by means of which detected data can be stored. It may further be advantageous when the sensor device comprises at least one evaluation unit by means of which data which is detected by one or more sensors can be processed. Therefore, it is conceivable, for example, for an evaluation unit to process data, which has been detected by a pressure sensor, by means of storing a specific logic, whereupon interpretation of the data can already be performed in or on the sensor device. Then, not only raw data from a respective sensor, but rather data which has already been processed is used by means of the transmitter.

In a further refinement, the sensor device according to the invention comprises this at least one quick-action coupling by means of which the sensor device can be connected to the gas connection of the container without tools. A quick-action coupling of this kind allows the sensor device to be connected to the container simply by means of being plugged on and latched, wherein the quick-action coupling latches in on the gas connection and in this way establishes a force-transmitting connection between the sensor device and the container. Conversely, when using a quick-action coupling of this kind, it is likewise easily possible to remove the sensor device from the container again, for example for maintenance purposes. As an alternative to using a quick-action coupling, it is of course likewise conceivable to fix the sensor device to the container in a different way, for example by means of a screw connection.

From a procedural respect, the underlying problem is solved by a method provides for a sensor device to be connected to a gas connection of the container, wherein a connection in terms of flow between a gas connector and a medium channel of the sensor device and the interior of a tank is container is established. This ensures that, in spite of occupation of the gas connection of the container by the sensor device, it is further possible to connect a protective gas line to the container, wherein according to the invention the latter is connected to the gas connector of the sensor device. In this way, a respective protective gas, for example carbon dioxide, can flow starting from the protective gas line, through the gas connector and the medium channel of the sensor device, into the interior of the tank. Furthermore, according to the invention, data relating to at least one state parameter of the container and/or of a filling material which is located in the tank is detected by means of at least one sensor of a telemetry module of the sensor device and used in a wireless manner by means of a transmitter. In this way, a state of the container can be continuously monitored, as can already be seen from the above explanation.

A further particular advantage of the method according to the invention is that it can be readily applied to any existing container since the sensor device is connected to a gas connection of a respective container that is present in any case. In this way, the sensor device is fixed to the container, wherein disassembly of the sensor device is possible preferably without tools.

BRIEF DESCRIPTION OF THE DRAWINGS

The container according to the invention is explained in more detail below with reference to an exemplary embodiment which is illustrated in the figures, in which.

DETAILED DESCRIPTION OF THE PREFERRED EMBODIMENTS

Figure 1:
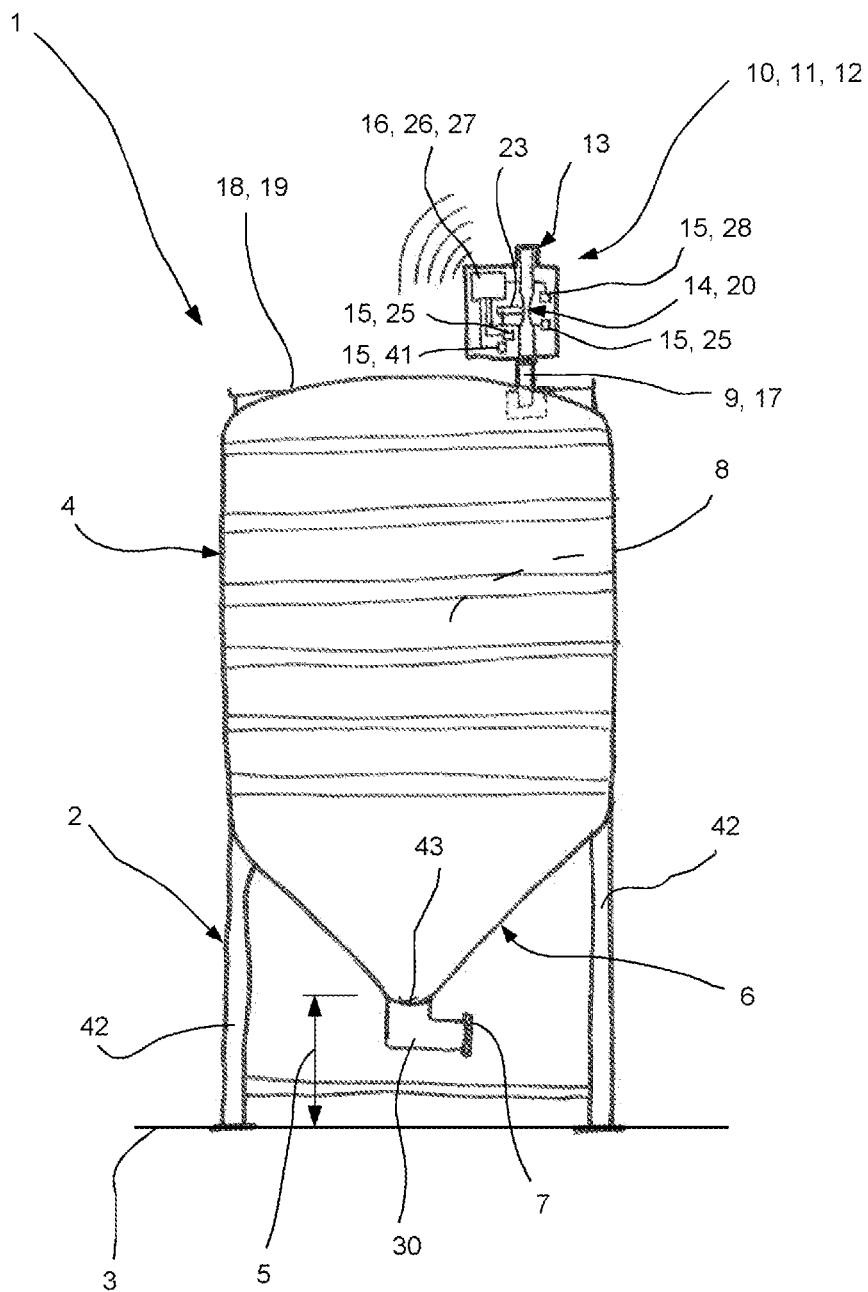
FIG. 1: shows a schematic side view of a container according to the invention.
Figure 2:
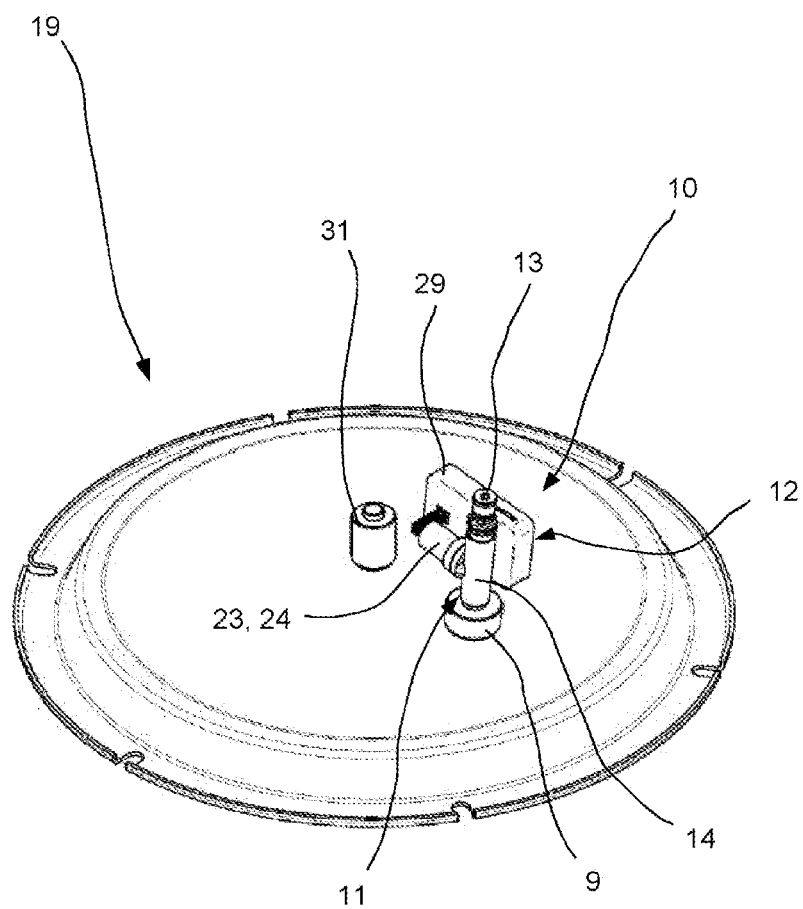
FIG. 2: shows a perspective view of a lid of the container according to FIG. 1.

An exemplary embodiment, which is shown in FIGS. 1 to 9, comprises a container 1 according to the invention which comprises a tank 4 and a frame 2. The frame 2, in turn, comprises a plurality of legs 42 by means of which the container 1 stands on the ground 3. The tank 4 is mounted at a distance from the ground 3 by means of the frame 2 in such a way that a bottom side 6 of the tank 4 is accessible from below. In particular, a deepest point 43 of the tank 4 is located at a distance 5 from the ground 3. Said deepest point 43 interacts with an opening 7 through which an interior 8 of the tank 4 can be charged with filling material or said filling material can be removed from the interior 8. To this end, the tank 4 interacts with a connection pipe 30 which has an angle of 90°, so that a cross section of the opening 7 is oriented in a vertical manner. Here, the opening 7 interacts with a connection piece, so that a filling material hose can be coupled to the opening 7, it being possible for filling material to be removed from the tank 4 or, conversely, for filling material to be filled into the tank 4 by means of said filling material hose.

The container 1 according to the invention has a lid 19 on a top side 18, a gas connection 9 and a pressure-relief valve 31 being formed on said lid. This gas connection 9 serves to interact with a protective gas line, not illustrated in the figures. A protective gas line of this kind creates the possibility of feeding a protective gas, for example carbon dioxide, to the interior 8 of the tank 4. Protective gas of this kind is important in order to fill a free volume which is available in the tank 4 and is not filled with a respective filling material. In particular, there is often a requirement to prevent the filling material from coming into contact with oxygen, whereupon the filling material would oxidize. The protective gas prevents reactions of this kind and therefore contributes to a long shelf life of the filling material within the tank 4. The protective gas line is typically connected to a pressure source by means of which the respective protective gas is made available in a pressurized manner. This ensures that, during the course of removal of the filling material from the tank 4, protective gas accordingly directly subsequently flows into the released volume in the tank 4.

In the example shown, the gas connection 9 interacts with a gas connector 17 which is suitable here for interacting with a quick-action closure 32 of the protective gas line. In this way, it is particularly easily possible to connect the protective gas line to the gas connection 9 without tools and to establish a connection in terms of flow to the interior 8 of the tank 4. Conversely, it is likewise easily possible to remove the protective gas line from the gas connection 9 again.

According to the invention, the container 1 according to the invention comprises a sensor device 10 which comprises an adapter element 11 and a telemetry module 12. The adapter element 11 comprises a medium channel 14 and a gas connector 13. Furthermore, the adapter element 11 has a connection section 44 which is designed in a complementary manner to the gas connector 17 of the gas connection 9 of the tank 4. In this way, the sensor device 10 can be fixed to the gas connector 17, wherein the sensor device 10 can be plugged onto or is plugged onto the gas connector 17 in a certain manner. In this case, the gas connector 17 has a sealing ring 34 by means of which the adapter element 11 can be sealed off from the gas connection 9. The mechanism between the connection section 44 and the gas connector 17 is, in principle, identical to that by means of which a protective gas line can be connected to the gas connector 17. In this way, it is particularly easily possible to fix the sensor device 10 to the container 1, wherein the sensor device 10, by means of its adapter element 11, is detachably plugged onto the gas connector 17 only without tools and without destruction, and is latched in there.

At an end which is averted from the lid 19 of the container 1, the adapter element 11 has the gas connector 13 which interacts with a quick-action closure 32 in the example shown. The quick-action closure 32 is sealed off from the gas connector 13 of the adapter element 11 by means of a sealing ring 33. Here, the gas connector 13 is particularly advantageously designed to be compatible with the gas connector 17 of the tank 4. In particular, the gas connector 13 of the adapter element 11 reproduces the gas connector 17 of the gas connection 9 in an at least substantially, preferably completely, identical manner. This ensures that a respective protective gas line can be directly connected to the gas connector 13 of the adapter element 11, instead of to the gas connector 17 of the gas connection 9, without any need for adaptation or change. In this way, the container 1 according to the invention can continue to be used without any conversion, even though the actual gas connection 9 of the container 1 is now used for fixing the sensor device 10 to the container 1. The gas connector 13 of the adapter element 11 interacts in terms of flow with the medium channel 14 of said adapter element, so that, after a protective gas line is connected to the gas connector 13 (here using the quick-action closure 32), the respective protective gas can flow directly through the medium channel 14 to the gas connection 9 of the tank 4 and finally into the interior 8 of the tank 4.

In the example shown, the telemetry module 12 of the sensor device 10 comprises a plurality of sensors 15 and a transmitter 16. In particular, the telemetry module 12 has a geoposition sensor 41, an acceleration sensor 25, a temperature sensor 28, a data logger 26 and an evaluation unit 27. These components of the telemetry module 12 are accommodated together in a housing 29 which protects said components against external influences, in particular moisture and dirt. The sensors 15 are suitable for detecting data relating to at least one state parameter of the container 1 and/or a state parameter of the filling material which is stored in the container 1. Said data can be transmitted—possibly after being buffer-stored in the data logger 26 and possibly being processed by means of the evaluation unit 27—by means of the transmitter 16, so that said data can be called up remotely in a wireless manner. For example, it is conceivable to detect an absolute position of the container 1 by means of the geoposition sensor 41 and to transmit said absolute position by means of the transmitter 16. In this way, it is possible, for example, for a customer who has purchased a respective filling material to monitor a location of the container 1 and in this way estimate when the container 1 can be expected at his premises. In the same way, it is conceivable to permanently monitor a temperature of the filling material, as a result of which quality assurance is simplified. The detected data can be stored by means of the data logger 26, so that not only can respectively current data records additionally be called up, but rather a history can also be evaluated in particular. Furthermore, acceleration states of the container 1 can be detected by means of the at least one acceleration sensor 25, wherein, for example, it can be inferred that there has been an accident in the case of sharp fluctuations.

Figure 3:
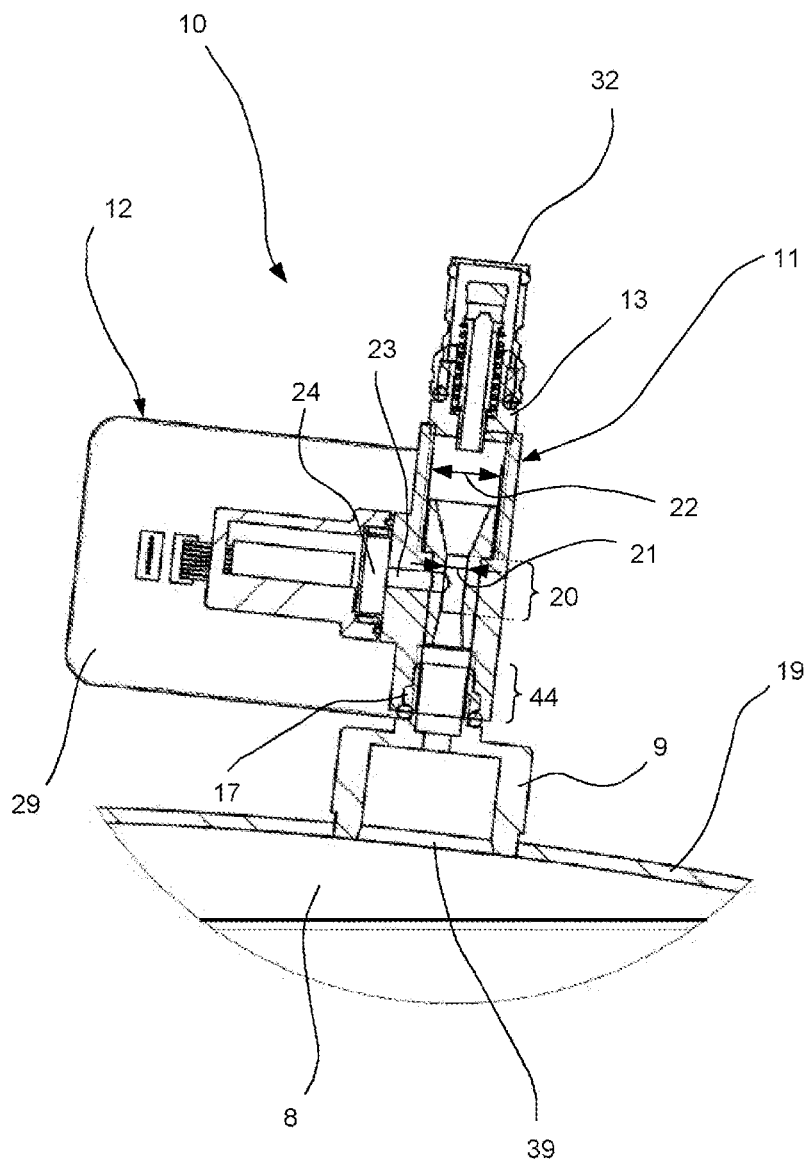
FIG. 3: shows a vertical cross section through a sensor device of the container according to FIG. 1, FIG. 4: shows a detail of the sensor device according to FIG. 3, FIG. 5: shows a detail of an alternative sensor device.

In the exemplary embodiment shown according to FIG. 3, the medium channel 14 of the adapter element 11 comprises a constriction 20 in the region of which a cross section 21 of the medium channel 14 is reduced in relation to a cross section 22 outside the constriction 20. In particular, the constriction 20 is designed in such a way that the medium channel 14 widens on either side of the constriction 20. In this way, the medium channel 14 is designed in the form of a Venturi nozzle in the region of the constriction 20. The reduction in the cross section of the medium channel 14 leads to the protective gas flowing through the medium channel 14 being accelerated in the region of the constriction 20. Accordingly, a flow rate of the protective gas 20 in the region of the constriction 20 is greater than in a region outside the constriction 20. This leads to a dynamic pressure of the protective gas increasing in the region of the constriction 20, as a result of which a static pressure, which presses hydrostatically on a wall of the medium channel 14, conversely decreases.

Furthermore, the medium channel 14 interacts with a spur line 23, the longitudinal axis of which is oriented perpendicularly to a longitudinal axis of the medium channel 14. In other words, the spur line 23 meets the medium channel 14 in the region of the constriction 20 at an angle 48, here a 90° angle. At an end which is averted from the medium channel 14, the spur line 23 interacts with a pressure sensor 24. Said pressure sensor is suitable for detecting data relating to a static pressure within the spur line 23. According to the above explanation, said static pressure changes as soon as protective gas flows through the medium channel 14. A flow of this kind can accordingly be determined by means of a change in the pressure within the spur line 23, wherein said change is detected by means of the pressure sensor 24. In this way, it is possible to determine by means of the sensor device 10 immediately when protective gas flows through the adapter element 11. The latter, in turn, usually happens only when filling material is removed from the interior 8 of the tank 4, wherein a released volume within the tank 4 is filled with additional protective gas as a result. Accordingly, it is conceivable, for example, for the beginning of removal of filling material from the tank 4 to be identified in the form of a drop in pressure in a pressure profile curve which is created using data which is gathered by means of the pressure sensor 24.

Figure 9:
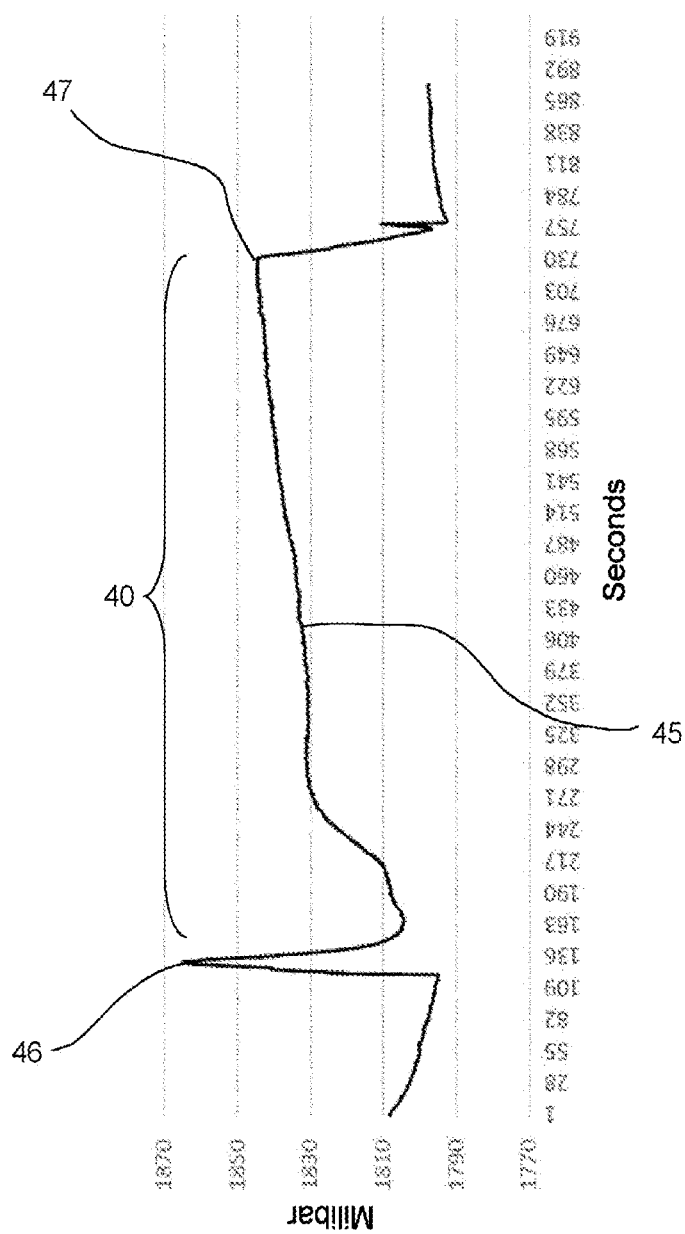

This phenomenon can be identified, for example, on the basis of a pressure profile curve 45 which is illustrated in FIG. 9. Here, a peak 46 can be identified in particular, which peak initially identifies connection of a protective gas line to the container 1, as a result of which the static pressure at the pressure sensor 24 sharply increases. This is due to the protective gas line being connected to a pressure source, the pressure of which pressure source exceeds an internal pressure of the tank 4. At the beginning of removal of the filling material from the tank 4, a directed flow of the protective gas through the medium channel 14 then takes place, whereupon the static pressure at the pressure sensor 24 drops suddenly in accordance with the above explanation. The sharp drop in the pressure profile curve 45 in the region of the peak 46 can therefore indicate the beginning of removal of filling material from the tank 4. Furthermore, the pressure profile curve 45 can identify a further high point 47 from which the pressure profile curve 45 drops sharply. This point can be interpreted as the time at which the tank 4 is completely emptied, that is to say all of the filling material has been removed from the tank 4. A pump by means of which the filling material is removed by suction from the tank directly draws the protective gas at this time, so that the static pressure within the container 1 and analogously within the medium channel 14 and the spur line 23 decreases suddenly. Accordingly, said high point 47 can be interpreted as the time at which the tank 4 is completely emptied.

Continuous detection of the pressure by means of the pressure sensor 24 allows analysis of the filling level of the tank 4 with filling material by way of at least one time period 40 within which removal of filling material from the container 1 takes place being able to be detected. In the example shown in FIG. 9, removal takes place in such a way that the tank 4 of the container 1 is finally completely emptied. As an alternative, it is likewise conceivable for removal of the filling material to be at least temporarily ended before the tank 4 is completely emptied. End of removal would be identifiable in the pressure profile curve 45 on the basis of a sudden increase in the static pressure since, without removal of further filling material from the tank 4, flow of protective gas through the medium channel 14 would become established and consequently the dynamic pressure decreases, while the static pressure increases. On the basis of the pressure profile curve 45, the time period over which filling material has been removed from the tank 4 can then finally be determined. Conversely, a statement can be made as a result about the filling level of filling material still present within the tank 4. Consequently, it is possible to monitor a filling level of the tank 4 of the container 1 by means of monitoring the pressure by means of a pressure sensor 24 of the sensor device 10.

In an alternative refinement of the adapter element 11, a change in the pressure within the medium channel 14 is not detected in accordance with the Venturi principle according to the above explanation, but rather by means of a so-called pitot tube 35. A corresponding refinement can be gathered with reference to FIG. 5. Said pitot tube 35 has an opening cross section 36 which is oriented perpendicularly to a flow direction of the protective gas and through which flowing protective gas can enter the pitot tube 35 and can finally be conducted to a pressure sensor 24. By means of an arrangement of this kind, the dynamic pressure in the protective gas within the medium channel 14 or a change in said dynamic pressure can be detected, so that it is also possible to determine with an arrangement of this kind immediately when a flow of protective gas through the medium channel 14 starts. According to the above explanation, the occurrence of a flow of this kind can be associated with removal of filling material from the tank 4, so that the beginning and the end of removal of filling material from the container 1 can be detected on the basis of data detected by the pressure sensor 24, wherein finally a conclusion can be drawn about the filling level of the filling material within the tank 4 by means of determining a time period over which removal has taken place.

Figure 4:
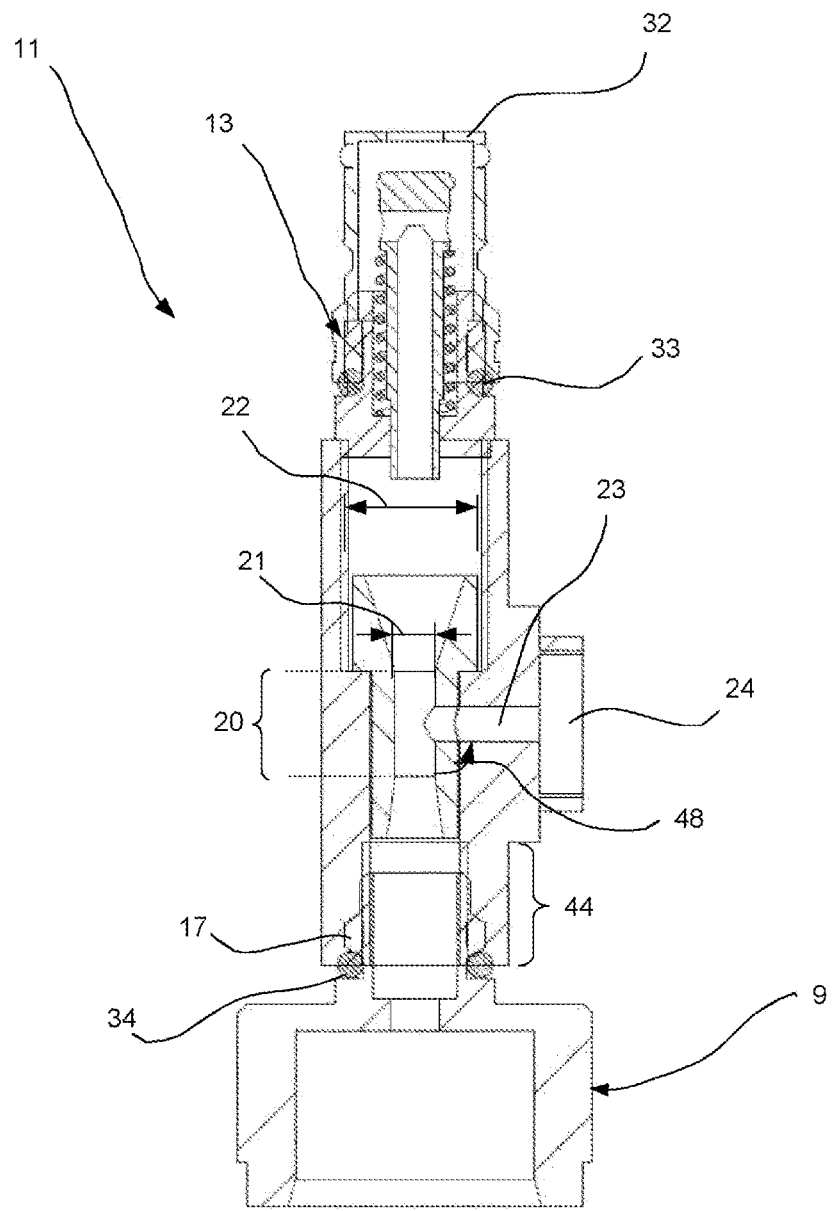
Figure 5:
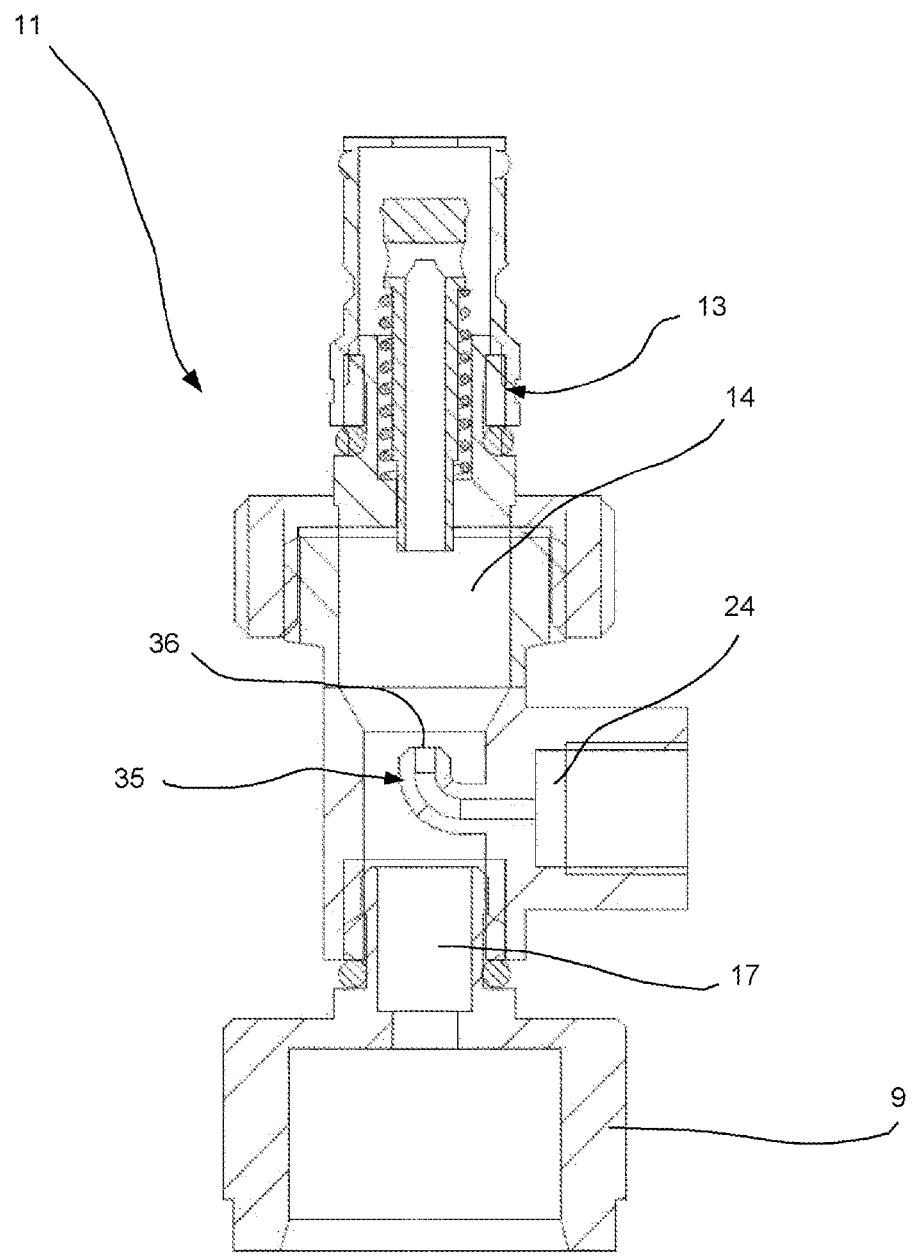
Figure 6:
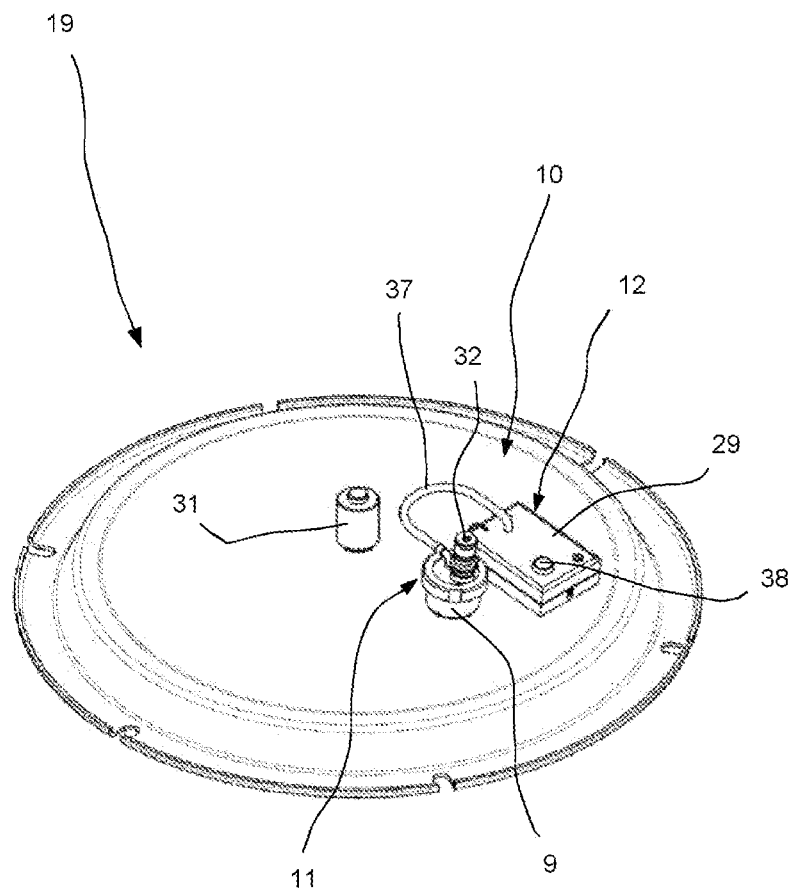
FIG. 6: shows a perspective view of a lid for a container according to FIG. 1, but with an alternative sensor device.
Figure 7:
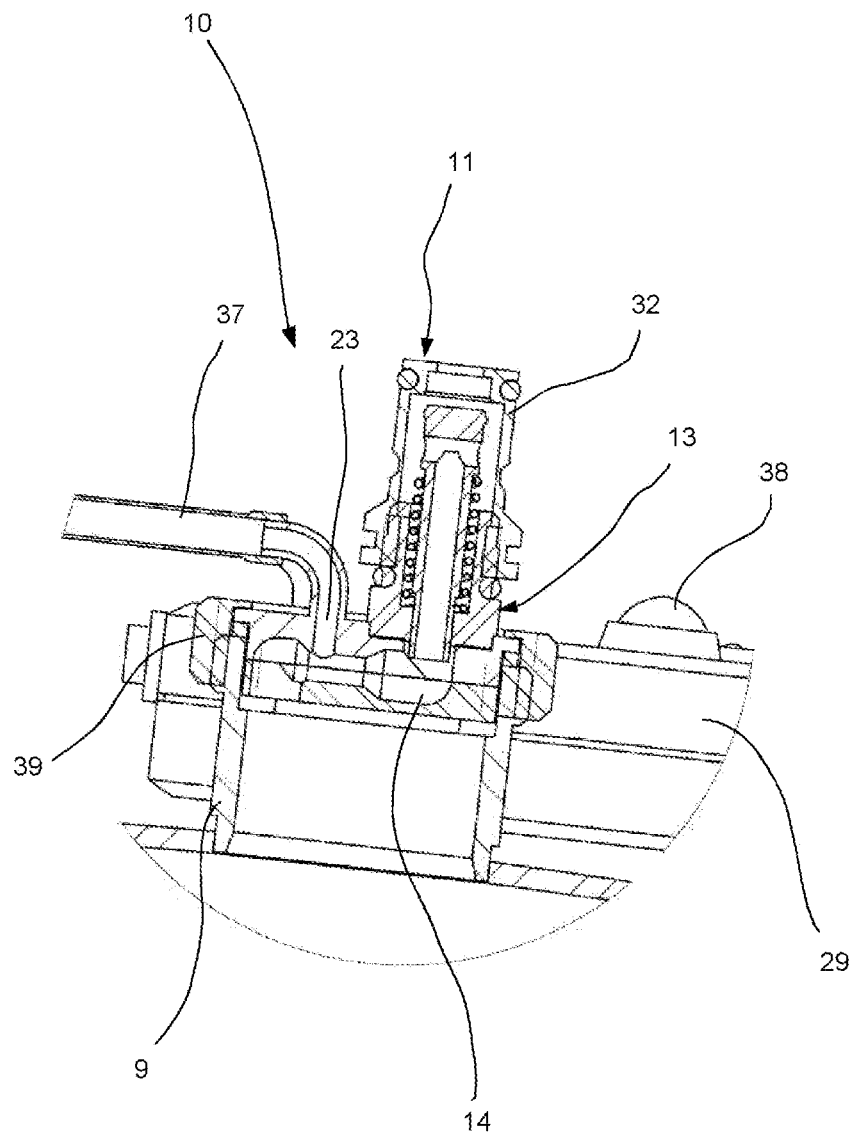
FIG. 7: shows a vertical cross section through the sensor device according to FIG. 6, FIG. 8: shows a detail of the sensor device according to FIG. 7, and FIG. 9: shows a pressure profile curve during removal of filling material from a container according to the invention.
Figure 8:
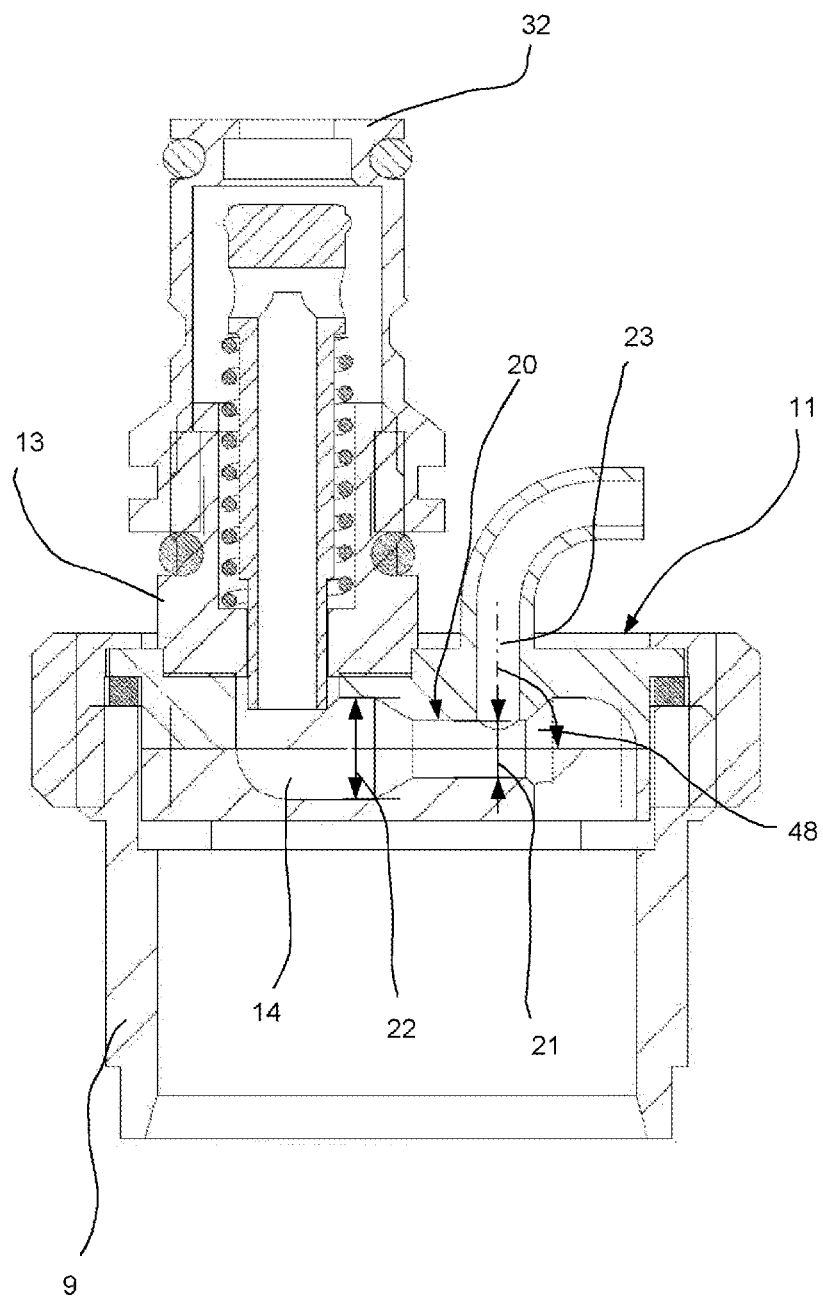

An alternative embodiment of a sensor device 10, which is illustrated in FIGS. 6 to 8, comprises an adapter element 11 which is designed to be significantly smaller than the sensor devices 10 according to FIGS. 3 to 5. Said sensor device 10 is connected to the gas connection 9 of the tank 4 by means of a union nut 39. In the example shown, the gas connection 9 as such does not have a dedicated gas connector 17, so that connection of a protective gas line to the tank 4 is possible only via the gas connector 13 of the adapter element 11. The associated container 1 is accordingly designed in such a way that it depends on the arrangement of the sensor device 10 on the gas connection 9 in order to be used as intended. In contrast to the sensor devices 10 described above, in the alternative variant the medium channel 14 is oriented at least substantially horizontally, as a result of which the required installation space volume of the adapter element 11 is considerably reduced. Comparably to the construction described above, the sensor device 10 according to FIGS. 6 to 8 also has, in its medium channel 14, a constriction 20 in which the cross section 21 of the medium channel 14 is reduced in relation to the cross section 22 of said medium channel outside the constriction 20. The sensor device 10 also has a spur line 23 which is connected to the medium channel 14 so as to form an angle 48 in the region of the constriction 20, wherein the angle 48 is formed by a right angle here. In this way, analogously to the above explanation, a change in the static pressure within the medium channel 14 can be detected, wherein the spur line 23 is designed in the form of a bent pipe here, a flexible connecting line 37 being connected in a leaktight manner at the end of said pipe. Said connecting line 37 interacts with a pressure sensor 24 at an end which is averted from the adapter element 11, which pressure sensor is accommodated in the associated telemetry module 12 here.

Here, the latter has a cuboidal housing 29 which is connected in a force-transmitting manner to the lid 19 of the container 1 in principle independently of the adapter element 11, in particular by means of a screw connection. Here, the telemetry module 12 has an LED 38 by means of which a state of operation of the telemetry module 12 or of the sensors 15 located in said telemetry module can be optically indicated.

LIST OF REFERENCE SIGNS

1 Container
2 Frame
3 Ground
4 Tank
5 Distance
6 Bottom side
7 Opening
8 Interior
9 Gas connection
10 Sensor device
11 Adapter element
12 Telemetry module
13 Gas connector
14 Medium channel
15 Sensor
16 Transmitter
17 Gas connector
18 Top side
19 Lid
20 Constriction
21 Cross section
22 Cross section
23 Spur line
24 Pressure sensor
25 Acceleration sensor
26 Data logger
27 Evaluation unit
28 Temperature sensor
29 Housing
30 Connection pipe
31 Pressure-relief valve
32 Quick-action closure
33 Sealing ring
34 Sealing ring
35 Pitot tube
36 Opening cross section
37 Connecting line
38 LED
39 Opening
40 Time period
41 Geoposition sensor
42 Leg
43 Deepest point
44 Connection section
45 Pressure profile curve
46 Peak
47 High point
48 Angle

The invention claimed is:

1. A container for transporting a flowable filling material, comprising:
a frame configured to place the container on the ground;
a tank for storing the filling material, the tank being supported by the frame at a distance from the ground so that a bottom side of the tank is accessible, the bottom side of the tank having opening through which the filling material is conducted into an interior of the tank for filling the tank and through which the filling material is removed from the interior, and the tank having a gas connection connectable with a protective gas line;
a sensor device including a telemetry module and an adapter element having a gas connector and a medium channel, the sensor device being connectable to the gas connection of the tank by the adapter element,
wherein the gas connector of the adapter element is connectable to a protective gas line when the adapter is connected to the gas connection of the tank so that a protective gas is conductible through the gas connector and the medium channel of the adapter element and into the interior of the tank, and
the telemetry module includes a sensor and a transmitter, the sensor being capable of detecting data relating to a state parameter of the container and/or the filling material and the transmitter being capable of wireless transmission of the data.

2. The container as claimed in claim 1, wherein the sensor device is releasably connectable to the gas connection of the tank by the adapter element.

3. The container as claimed in claim 1, wherein the gas connection of the tank has a gas connector and the adapter element is configured to connect onto the gas connector of the tank in an interlocking manner.

4. The container as claimed in claim 3, wherein the gas connector of the adapter element reproduces in a compatible manner the gas connector of the tank at least with respect to function.

5. The container as claimed in claim 3, wherein the gas connector of the adapter is identical to the gas connector of the tank.

6. The container as claimed in claim 2, wherein the sensor device is screwed to the gas connection of the tank.

7. The container as claimed in claim 1, wherein the sensor device is materially joined to the gas connection of the tank by the adapter element.

8. The container as claimed in claim 1, wherein the gas connection of the tank is disposed on a top side of the tank.

9. The container as claimed in claim 8, wherein the gas connection of the tank is arranged on a lid of the tank.

10. The container as claimed in claim 1, wherein the medium channel has a constriction at which a cross section of the medium channel is reduced in relation to a cross section of the medium channel outside the constriction.

11. The container as claimed in claim 10, wherein the medium channel is widened in relation to the cross section of the constriction on either side of the constriction.

12. The container as claimed in claim 1, wherein the sensor device includes a spur line that interacts in terms of flow with the medium channel of the adapter element.

13. The container as claimed in claim 10, wherein the sensor device includes a spur line connected to the medium channel in the region of the constriction.

14. The container as claimed in claim 12, further comprising a pressure sensor that interacts with an end of the spur line remote from the medium channel, the pressure sensor detecting pressure fluctuations within the spur line that occur as a result of protective gas flowing through the medium channel.

15. The container as claimed in claim 1, further comprising a pressure sensor and a pitot tube with an opening cross section arranged within the medium channel of the adapter, the opening cross section is oriented in relation to the flow direction of the protective gas in the medium channel in such a way that a portion of the protective gas enters the pitot tube, wherein the pitot tube connects the opening cross section in a fluid-conducting manner to the pressure sensor.

16. The container as claimed in claim 15, wherein the opening cross section is oriented perpendicularly to the flow direction of the protective gas in the medium channel.

17. The container as claimed in claim 1, wherein the telemetry module includes a geoposition sensor capable of detecting data relating to an absolute position of the sensor device.

18. The container as claimed in claim 1, wherein the telemetry module includes an acceleration sensor capable of detecting data relating to accelerations of the sensor device.

19. The container as claimed in claim 1, wherein the telemetry module includes a temperature sensor capable of detecting an ambient temperature and/or a temperature of the filling material located in the tank.

20. The container as claimed in claim 1, wherein the telemetry module includes a data logger storing detected data.

21. The container as claimed in claim 1, wherein the telemetry module includes an evaluation unit that evaluates detected data.

22. A method for operating a container for transporting a flowable filling material, comprising the steps of:
- arranging a sensor device on a gas connection of the container by an adapter element and establishing a connection allowing a flow through a gas connector and a medium channel of the adapter element to an interior of a tank of the container;
- connecting a protective gas line to the gas connector of the sensor device, so that protective gas can be conducted starting from the protective gas line, through the gas connector and the medium channel, into the interior of the tank; and
- detecting, by a sensor of a telemetry module of the sensor device, data relating to at least one state parameter of the container and/or a filling material in the tank of the container and wirelessly transmitting, by a transmitter of the telemetry module, the data.

* * * * *